Sept. 29, 1959

W. E. WOODS 2,907,021

DIGITAL-TO-ANALOGUE CONVERTER

Filed Dec. 31, 1956

INVENTOR.
William E. Woods
BY
Morris Rabkin
ATTORNEY.

United States Patent Office 2,907,021

Patented Sept. 29, 1959

2,907,021

DIGITAL-TO-ANALOGUE CONVERTER

William E. Woods, Haddonfield, N.J., assignor to Radio Corporation of America, a corporation of Delaware Application December 31, 1956, Serial No. 631,957

5 Claims. (Cl. 340—347)

This invention relates to apparatus for converting digitally-coded signals to signals in analogue form.

In information handling systems, the information is frequently encoded in digital form, such as a binary system. In such information handling systems, it is often desirable to have the signals in an analogue form, in which the information is represented by a continuously varying characteristic of the signals, such as their time duration or amplitude. It is often desirable to convert signals that appear in digital form to a form in which varying signals represent the digital information.

It is among the objects of this invention to provide a new and improved converter circuit.

Another object is to provide a new and improved circuit for converting information in digital form to an analogue form.

In accordance with this invention, means are provided for generating waveforms that have time durations forming a binary progression, that is, the waveforms have successive binary values. These waveforms are supplied to an integrator means in accordance with binary input signals so that those binary waveforms corresponding to the values of a binary coded input are supplied to the integrator means. The integrator means produces an output signal whose magnitude is proportional to the binary input.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
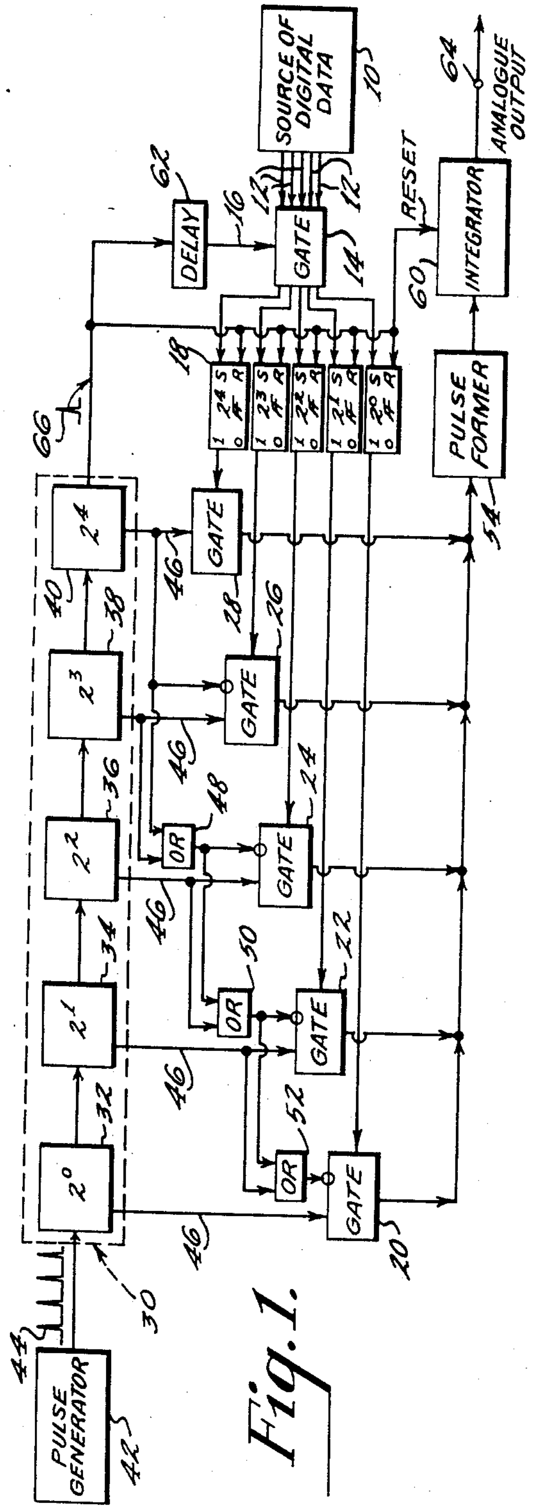
Figure 1 is a schematic block diagram of a conversion system embodying this invention.

In Figure 1, an input to the system is a source 10 of digital data. This source 10 supplies signals in binary coded form to the system of Figure 1. This source 10 may be the output of a digital computer, or any digital communication system. The signals from the source 10 (which may take the form of binary signals, such as a pulse and the absence of a pulse, respectively) are supplied by way of parallel input channels 12 to a set of coincidence, or "and" gates 14 (only one of which is shown for simplicity of presentation). The gates 14 receive a gating or clock pulse by way of the channel 16, and these gates 14 pass the signals in the channels 12 to inputs of individual flip-flops 18.

These flip-flops 18 may be bistable trigger circuits, each having two input terminals designated "S" and "R" and two output terminals designated "1" and "0". One output (illustratively, the 1-output) of each flip-flop 18 is connected to a separate "and" or coincidence gate 20, 22, 24, 26, 28. The application of a pulse to the S-input sets the flip-flops with its 1-output established at a certain voltage level, which level is effective to place the coincidence gates 20, 22, 24, 26, 28 in an enabled or open condition. The application of a pulse to the R-input resets the associated flip-flop 18, which assumes a reverse condition such as to close the associated gate 20, 22, 24, 26, 28.

Each of these gates 20, 22, 24, 26, 28 corresponds to a different binary position $2^0$, $2^1$, $2^2$, $2^3$, $2^4$, respectively, of the flip-flops 18. Each gate 20 to 28 receives an output from a counter 30, which output is from a counter stage that corresponds to the binary position associated with that gate. The counter 30 is a binary counter having five stages 32, 34, 36, 38, 40, corresponding to the five binary positions of the digital signals supplied from the source 10. The principles of this converter system are also applicable to digital systems having other than five signal positions.

Figure 3:
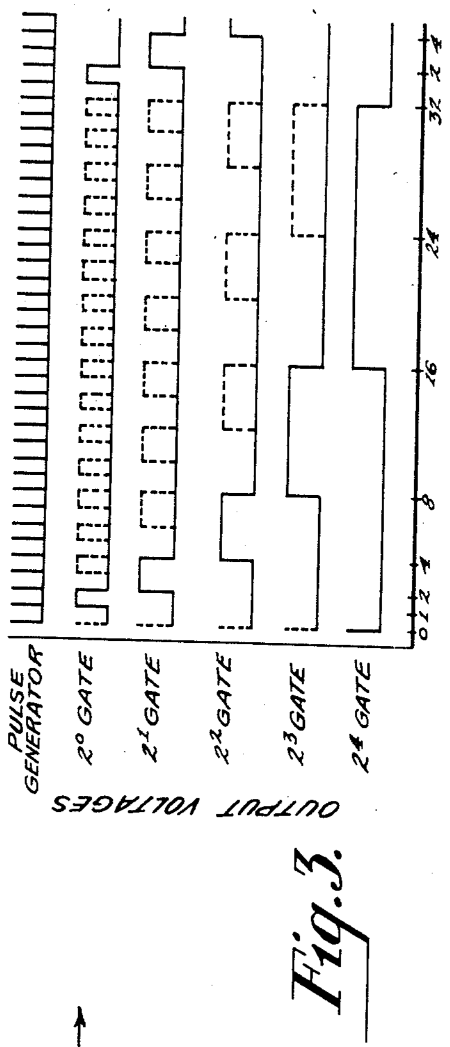
Figure 3 is an idealized graph of waveforms appearing in certain portions of the system of Figure 1.

Input pulses 44 from a pulse generator 42 are supplied to the first stage 32 of the binary counter 30. The pulse generator 42 may be any suitable stable oscillator circuit with a pulse shaper to supply periodic pulses of an appropriate frequency and form to the counter 30. The relative timing of the pulses 44 is shown in Figure 3.

The outputs 46 of the stages 32—40 of the counter 30 are respectively supplied to gating inputs of the gates 20—28. The output 46 of the last counter stage 40 is also connected to an "inhibit" input of the gate 26. This inhibit input of the gate 26 (and of the gates 20, 22, 24) is represented by a circle to distinguish it from the other gating inputs. The operation of the inhibit input is such that a waveform (for example, a positive-going voltage) tends to close the gate even though it is enabled by its associated flip-flop 18. The output 46 of the counter stage 40 is also connected to an input of an "or," or buffer, circuit 48. The output of the counter stage 38 is also connected to an input of the "or" circuit 48. The output of this "or" circuit 48 is connected to the inhibit input of the gate 24, and also to another "or" circuit 50. The output 46 of the counter stage 36 is connected to another input of the "or" circuit 50. The output of that circuit 50 is connected to the inhibit input of the gate 22. An "or" circuit 52 receives the output of the "or" circuit 50 and also the output of the counter stage 34. The output of the "or" circuit 52 is supplied to the inhibit input of the gate 20.

Appropriate forms of gate circuits that may be employed are described in the article "Diode Coincidence and Mixing Circuits" by Tung Chang Chien, in the Proceedings of the I.R.E., May 1950, page 511. The flip-flops may each be a bistable multivibrator such as the Eccles-Jordan trigger circuit, and the binary counter may be of the type that employs such circuits, examples of which are described in the book "High-Speed Computing Devices," McGraw-Hill, 1950, chapter 3.

Figure 2:
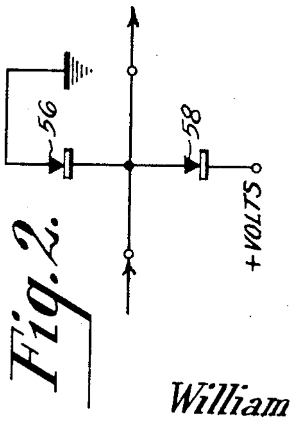
Figure 2 is a schematic circuit diagram of a pulse former that may be used in the system of Figure 1.

The output of the gates 20, 22, 24, 26, 28 are all connected to the input of a pulse forming circuit 54. This pulse former 54 is used to modify the outputs of the gates 20—28 to insure that they have uniform or standardized amplitudes. A suitable circuit for the pulse former 54 is shown in Figure 2. It includes two diodes 56 and 58 respectively connected cathode to anode. The anode of the diode 56 is connected to a reference potential shown as ground, and the cathode of the diode 58 is shown connected to a more positive voltage level. These voltage levels are chosen to be respectively greater than and less than the range of outputs that may be supplied by the gates 20—28. Thereby, the diode 56 conducts to insure a uniform base level for the outputs of the gates 20—28, and the diode 58 conducts to insure a uniform upper level for these outputs.

The output of the pulse former 54 is supplied to an integrator 60. This integrator 60 may be of the resettable, bootstrap integrator type. This integrator 60 receives a resetting pulse 66 from the last stage 40 of the counter 40. The pulse 66 from the last stage of the counter 40 is also supplied to the R-inputs of the flip-flops 18. This output 66 of the counter stage 40 is supplied by way of a delay circuit 62 to the channel 16 for opening the gates 14. The output voltage of the integrator 60 is connected to an output terminal 64, which terminal 64 is the output of the system. Amplifier stages may be included in various portions of the system where desirable.

In operation, the five-stage binary counter 30 counts from a count of 1 through a count of 31 and then recycles to 0. The pulse 66 from the last stage 40 is generated when the counter recycles to 0. This "overflow" pulse is used to reset the flip-flop 18 and to open the gates 14 to pass the next input signal combination into the flip-flops 18. The flip-flops 18 are set if the corresponding input digit is a "1" and the flip-flops remain reset if the corresponding inputs are a binary "0." The gates 20 to 28 associated with those flip-flops that are set are primed to an enabling condition, that is, an open-gate condition. For example, if the $2^4$ flip-flop 18 is in the set condition, the gate 28 is opened to pass the waveform appearing on the output channel 46 of the $2^4$ counter stage 40. As indicated in the idealized graph of Figure 3 (at the line labeled "$2^4$ gate"), the output of the stage 40 of the counter 30 is at a low-voltage level during the count from 0 through 15. At the count of 16, the counter stage 40 changes from the "0" state to the "1" state in which "1" state the output of that stage 40 is a relatively high voltage level. The output of the counter stage 40 remains at a high voltage level during the count from 16 through 31.

The gate 26 receives the output of the stage 38. Stage 38 registers a "1" and has a high-voltage output level during the pulse count from 8 through 15 and during the pulse count from 24 through 31 (the latter waveform being indicated in dotted lines in Figure 3). If the gate 26 is opened by the $2^3$ flip-flop 18 being set, the positive going waveform during the pulse count from 8 through 15 is passed by that gate 26. However, the positive-going waveform (shown in dotted lines in Figure 3) during the pulse count from 24 through 31 is not passed by the gate 26, because that gate 26 is inhibited by the positive-going waveform from the output of the $2^4$ stage 40 during that portion of the count.

In a similar manner, the gate 24 passes the positive-going output from the $2^2$ counter stage 36 during the count from 4 through 7. However, the positive-going waveforms during the counts from 12 through 15, 20 through 25, and 28 through 31 (each shown in dotted lines in Figure 3) are inhibited by the outputs of the counter stages 38 or 40. Similarly, the output of $2^1$ gate 22 may be a positive-going level during the counts of 2 and 3, but the positive-gonng levels (shown in dotted lines) applied to that gate 22 during the remainder of the count from 4 through 31 are inhibited by the output of at least one of the counter stages 36, 38, and 40. The $2^0$ gate 20 passes a positive-going waveform only during the count of 1; such waveforms are inhibited by the outputs of at least one of the other counter stages 34, 36, 38, and 40 during the remainder of the count from 2 through 31.

Thus, each gate 20 to 28 passes a positive-going waveform from its associated counter stage 32 to 40 only when (*a*) the associated flip-flop 18 is set, indicating that the input digit for that position is a "1," (*b*) the count registered in the associated stage of the counter 30 is a "1," and (*c*) the "1" digit registered in the associated counter stage is the most significant "1" of the registered count (for otherwise that gate would be inhibited by a more significant "1." The conditions *b* and *c* determine that the durations of the positive-going waveforms are in a binary progression and do not overlap in time.

The postive-going waveforms appearing at the outputs of the gates 20, 22, 24, 26, 28 are of successively increasing durations forming a binary progression from 1, 2, and so on up to 16 units of time. The unit of time corresponds to the time between successive pulses 44 from the generator 42. These positive-going waveforms at the outputs of the gates 20 to 28 are generated at different times as the counter 30 progresses through its count from 0 to 31.

The counter stages 32 to 40 are generally identical, therefore, the output waveforms in the channels 46 are substantially the same in their upper and lower voltage levels. Likewise, the gates 20 to 28 are similar in construction so that the output voltage amplitudes of these gates are likewise generally uniform. However, to insure high accuracy of operation, and to prevent any variations due to possible loading by the integrator 60, the pulse former 54 is provided. Thereby, the output of the pulse former 54 is at either of two accurately-established voltage levels, either the base level of ground or the positive level of some predetermined amplitude supplied at the cathode of the diode 58 (Figure 2).

The integrator 60 integrates the voltages received from the pulse former 54 to provide at the output 64 a voltage whose amplitude is essentially the sum of the durations of the individual positive-going pulses supplied by the gates 20 to 28.

A cycle of operation may be considered as starting with the counter 30 recycling to a count of 0, and the overflow pulse 66 being generated and supplied to the R-inputs of the flip-flops 18. These flip-flops 18 are reset and after a short delay provided by the delay circuit 62, the gates 14 are opened by this same pulse 66 to pass the next input code combination to the S-inputs of the flip-flops 18. Thus, the input code combination is established in the flip-flops 18 by the overflow pulse 66 in the time between successive pulses 44 from the generator 42. The integrator 60 is quickly reset by the same pulse 66 in the same time interval.

If the input code combination is, for example, 10110, and $2^0$ and $2^3$ flip-flops 18 are left reset, and the other three flip-flops are set. Accordingly, the gates 20 and 26 are left in the closed condition, and the gates 22, 24, and 28 are opened by the outputs of the associated flip-flops 18. Under these assumed circumstances, the gate 22 passes the positive-going waveforms during the time that the counter 30 registers the pulse counts of 2 and 3. The gate 24 passes a positive-going waveform during the time that the counter 30 registers the count from 4 through 7, and the gate 28 passes a positive-going waveform during the times that the counter 30 registers counts from 16 through 31. The integrator 60 integrates or sums these positive-going waveforms over the cycle of the count to provide an output voltage whose amplitude is proportional to 22, the decimal value of the counts during which the gates 22, 24, and 28 pass the positive-going waveforms, which is also the value of the binary input 10110.

A cycle of the counter 30, and of the converter circuit, is completed by the count recycling to 0, and the pulse 66 being generated. This pulse 66 resets the integrator 60, which action prepares it for the next digital code combination to be converted. This same pulse 66 again resets the flip-flops 18 and opens the gates 14 to receive the next digital code combination to be converted to an analogue form. Thus, successive digital inputs that are uncorrelated may be received, and a corresponding analogue voltage output may be derived therefrom.

In other types of application, the digital data input may represent repetitive samples of a continuously varying quantity. For such purposes, the integrator 60 may be in the form of a simple, linear, low-pass filter, instead of the resettable form of integrator considered above. With such an arrangement, each digital combination may be sampled over several counter cycles. For example, the time constant of the low-pass filter would be proportional to the square of the number of pulses in the counter cycle. The analogue voltage appearing at the terminal 64 would change continuously as the digital input continuously changes.

The principles of this invention are also applicable to other arrangements for deriving pulse durations that are proportional to successive binary values. For example, a series of one-shot, or slide-back, multivibrators (not shown) may be provided which have time constants that are proportional to successive binary values, such as, the values $2^0$ through $2^4$. These one-shot multivibrators may be arranged in cascade successively with the output of one being used to trigger on the next in succession at the time that the one resets to its normal condition, and so on. The first of these one-shot multivibrators in order may, in turn, be triggered by the last such one-shot multivibrator in a similar fashion. In addition, the first such multivibrator may be triggered to a starting pulse when the digital code combination to be converted is received. The successive pulse outputs of such a train of one-shot multivibrators over a cycle would be the same as the successive pulse waveforms produced at the outputs of the gates 20 to 28 of Figure 1 when all these gates are primed by the flip-flops 18. Thus, the pulse outputs of such a train of one-shot multivibrators may be gated to an integrator in a manner similar to the action of the gates 20 to 28 under the control of flip-flops such as the flip-flops 18 in a manner similar to that described above. A suitable construction for this multivibrator arrangement will be apparent to one skilled in the art from the above description.

Thus, in accordance with this invention, a new and improved converter circuit is provided. This circuit may be used to convert signals in binary digital form to an analogue form.

What is claimed is:

1. A converter circuit comprising means for successively generating a train of waveforms having different durations proportional to successive binary values, means for receiving a combination of digital signals each associated with a different one of said binary values, and means including an integrator for combining by integration certain ones of said waveforms selected in accordance with said received digital signals.

2. A converter circuit comprising binary counter means for successively generating a train of waveforms having different durations proportional to successive binary values, means for receiving a combination of digital signals each associated with a different one of said binary values, and means including an integrator for selectively combining by integration certain ones of said waveforms selected in accordance with said received digital signals.

3. A converter circuit comprising means for successively generating a train of waveforms having different durations proportional to successive binary values, means for receiving a combination of binary signals each having either a first or a second form corresponding to the binary significance thereof, each of said signals being associated with a different one of said binary values, and means including an integrator responsive to a certain one of said first and second signal forms of each signal of the received combination for selectively combining by integration those ones of said waveforms having binary values corresponding to those of said signals having said certain one signal form.

4. A converter circuit as recited in claim 3 wherein said generating means includes a binary counter.

5. A digital-to-analogue converter comprising input means for supplying a combination of binary signals having two forms, each of said signals being associated with a different power of the integer two; means for generating waveforms having different durations proportional to said powers of the integer two; said generating means including a binary counter having a plurality of stages each corresponding to a different one of said powers of the integer two, and separate gate means associated with each of said counter stages and connected to receive signals from the associated counter stage, each of said gate means being responsive to one of the forms of the associated binary signals from said input means for passing the signals from the associated counter stage; each of said gate means including means connected to receive signals from said counter stages of higher powers than that of the associated stage for closing the associated gate means to signals from the associated counter stage; and integrator means connected to receive signals passed by said gate means.

References Cited in the file of this patent

UNITED STATES PATENTS

| | | |
|---|---|---|
| 2,734,182 | Rajchman | Feb. 7, 1956 |
| 2,737,342 | Nelson | Mar. 6, 1956 |